United States Patent
Smith

(10) Patent No.: US 6,829,705 B2
(45) Date of Patent: Dec. 7, 2004

(54) SYSTEM INFORMATION DISPLAY METHOD AND APPARATUS

(75) Inventor: R. Doug Smith, Caldwell, ID (US)

(73) Assignee: MPC Computers, LLC, Nampa, ID (US)

( * ) Notice: Subject to any disclaimer, the term of this patent is extended or adjusted under 35 U.S.C. 154(b) by 641 days.

(21) Appl. No.: 09/796,504

(22) Filed: Feb. 28, 2001

(65) Prior Publication Data
US 2002/0120835 A1 Aug. 29, 2002

(51) Int. Cl.[7] ............................................. G06F 9/24
(52) U.S. Cl. .............................................. 713/1; 345/714
(58) Field of Search ................................. 713/1; 345/714, 345/809; 710/15

(56) References Cited

U.S. PATENT DOCUMENTS

| | | | |
|---|---|---|---|
| 5,754,858 A | | 5/1998 | Broman et al. ............. 395/701 |
| 5,848,397 A | * | 12/1998 | Marsh et al. ................ 705/14 |
| 6,006,035 A | | 12/1999 | Nabahi ....................... 395/712 |
| 6,049,871 A | * | 4/2000 | Silen et al. .................. 713/2 |
| 6,134,324 A | | 10/2000 | Bohannon et al. ........... 380/4 |
| 6,167,567 A | | 12/2000 | Chiles et al. ................ 717/11 |
| 6,173,445 B1 | * | 1/2001 | Robins et al. ............... 717/173 |
| 6,487,656 B1 | * | 11/2002 | Kim et al. ................... 713/2 |

OTHER PUBLICATIONS

Microsoft. "Welcome to Windows 98" dialog. 1998.*

* cited by examiner

Primary Examiner—Lynne H. Browne
Assistant Examiner—Eric Chang
(74) Attorney, Agent, or Firm—Trop, Pruner & Hu, P.C.

(57) ABSTRACT

Embodiments of the present invention include a system and method of displaying data about a computer system on the computer system. Embodiments of the invention automatically start a graphical user interface if there are files to be displayed. Embodiments may also include a removable storage media containing instructions to implement system and method embodiments.

42 Claims, 6 Drawing Sheets

Component List

The following is a list of components included with your new micronpc.com computer.

This list does not include peripheral components you may have ordered with your system such as a monitor, speaker system, or printer.

You may need this information if you obtain support on the micronpc.com web site or if you call Technical Support.

For better viewing please Maximize this document, click on the orange Maximize button located at the bottom of this window. To return the window to its previous size, click the orange Restore button.

You may want to print this document or as a minimum write down the following numbers:

WO: 90957-0001 (System serial number)
SO: 1735 (Order number)
CUST#: 30072 (Customer number).

System Description:
DESC: DTM.MILLENNIA EX.WITH ME COUPON.733MHZ.128MB.15GB.ULTRA ATA-66.48X VARIABLE SPEED.MICRO TOWER.4MB DISPLAY CACHE.810E.ZIP.OFFICE 2000 SB

| Part Number | Description | Quantity |
|---|---|---|
| BIO001038-01 | BIO.GVC CASCADE 2 8.10E AMI BIOS.1.00.07 | 1 |
| BZL001039-00 | BZL.POLARIS II BEZEL | 1 |
| CAB001210-00 | CAB.TIGER/FORTRON.SJT POWER SUPPLY CORD | 1 |
| CAB001549-00 | CAB.CABLE LINK.MICROATX.10".40CON KEYED. | 1 |
| CAB001550-02 | CAB.MICROATX.SINGLE FLOPPY.12".KEYED CAB | 1 |
| CAB001693-00 | CAB.IDE ATA 66 ULTRA CABLE.10".CASCADE | 1 |
| CDI001186-00 | CDR.SAMSUNG.48X VARIABLE SPEED.CDROM DR | 1 |
| COA001004-00 | LAA.WINDOWS 98SE.COA | 1 |
| CPU001544-01 | CPU.INTEL.PENTIUM III.733MHZ.ON DIE 133F | 1 |
| CSE001519-03 | CSE.MICRO ATX.(POLARIS II).CHASSIS ASSY. | 1 |
| FLY001219-00 | FLY.CONNECTED SUPPORT.COM FLYER | 1 |
| FLY001239-00 | FLY.5/3 YR. MICRON POWERSM.LIMITED WARRA | 1 |
| FLY001240-00 | FLY.WINDOWS ME.UPGRADE COUPON | 1 |
| HDI001500-00 | HDD.IBM.15GB.ATA 100 IDE.HARD DRIVE.7200 | 1 |
| ⋮ | | |
| HDW002483-00 | HDW.BEZEL 3.5 TO 5.25 ADAPTER | 1 |
| HDW002608-00 | HDW.FLIP CHIP ACTIVE HEATSINK | 1 |
| KBR001062-01 | KBR.MICROSOFT.NATURAL ELITE.KEYBOARD | 1 |
| LAA001059-02 | LAA.FCC/EC/BAR CODE SYSTEM LABEL.WITH RI | 1 |
| LAA001476-00 | LAA.GM NAMEPLATE.MILLENNIA.BEZEL BADGE M | 1 |
| LAA001527-00 | LAA.INTEL.PENTIUM III BEZEL LABEL | 1 |

Fig. 5

SYSTEM INFORMATION DISPLAY METHOD AND APPARATUS

TECHNICAL FIELD

The present invention is directed toward a system and method for presenting information about a computer system to a computer system user. More particularly, the system and method are useful in distributing computer system specific information with the computer system in a usable format and with low manufacturing costs.

BACKGROUND OF THE INVENTION

Computer systems are an integration of components that work together to accomplish computing tasks. Depending on the needs and desires of the user who orders a computer system, the components that are included in a system will vary. FIG. 1 illustrates an embodiment of a modern computer system and provides examples of components that may be included in a system. In the case illustrated, the computer system is a personal computer system.

FIG. 1 illustrates a processor 1 connected to a North Bridge (or host controller) 2. The North Bridge 2 connects to each of a main memory 3, a graphics controller 4, and a South Bridge (or controller hub) 5. The North Bridge and South Bridge are components of what is typically referred to as the chipset. The chipset is conventionally mounted on the motherboard of a computer system. Note that this is merely one example of a computer system, and other systems may connect components in somewhat different manners. For example, the graphics controller 4 could be integrated into the North Bridge 2, or the North Bridge 2 might also connect directly to a Peripheral Component Interconnect (PCI) bus, or some other bus or device, rather than being connected through the South Bridge 5. As illustrated, a PCI bus 6 is connected to the South Bridge 5. The PCI bus includes PCI slots 7 that are available to accept additional devices that will communicate with the computer system. Devices that may plug into the PCI slots include, but are not limited to, modems, network interface cards, graphics accelerators, and Small Computer System Interface (SCSI) drive adapters. An Industry Standard Architecture (ISA) bus bridge 8 is also shown. The ISA bridge 8 may be used to provide ISA slots to connect legacy ISA devices to the PCI bus and, therefore, the computer system. Similarly, a low pin count interface (LPC I/F) 9 is illustrated connecting a Super input/output (Super I/O) 10 to the South Bridge 5. The LPC I/F 9, in addition to the Super I/O 10 may connect other X-Bus devices and legacy ISA devices. The Super I/O 10 illustrated provides connections for various devices such as a keyboard 11, a mouse 12, a floppy disk (FD) 13, a parallel port (PP) 14, a serial port (SP) 15, and an infrared port (IR) 16. FIG. 1 also shows a firmware hub interface (FWH) 17 connected to the South Bridge 5. The FWH 17 is typically used to store and supply nonvolatile instructions such as basic input/output system (BIOS) instructions to the computer system. The BIOS, among other things, manages data flow between a computer's operating system and attached devices. The operating system, however, is the main software component responsible for system signal flow. Well-known operating systems in modern computer systems include such operating systems as various WINDOWS operating systems distributed by Microsoft Corporation, UNIX operating systems derived from the UNIX operating system originally created by AT&T Bell Labs and other similar derivatives such as the open-source operating system LINUX. There are many other operating systems, including operating systems created to operate computers manufactured by Apple Computer, Inc. A Universal Serial Bus (USB) 18 may also be connected to the South Bridge 5. Multiple devices may be connected to the USB 18. Several Integrated Drive Electronics (IDE) drives 19 may be connected to the South Bridge 5. IDE is a standard electronic interface used between a computer and disk storage devices. IDE devices may include hard disk drives, compact disc read-only memory (CD-ROM) drives, and numerous other disk devices. FIG. 1 also shows a System Management Bus (SMBus) 20 that enables additional devices to be connected to the South Bridge 5. The SMBus 20 is useful in performing management and information gathering functions within the computer system, and may connect one or more devices using the $I^2C$ data transmission protocol created by PHILLIPS ELECTRONICS or another capable protocol.

Each of these hardware and software components may be supplied by more than one component vendor, and component vendors may supply more than one variety of each component. Therefore, each component is a variable that must be uniquely identified by the manufacturer of the computer system. With each component as a variable, the number of possible combinations of components becomes very large.

Generally, there are two types of information that a user may want to know about a computer component. First, a user may simply want to know the product identifier for the component. Product identifiers are typically printed on a component, printed on a sticker that is placed on the component, or included in documentation that accompanies the computer system. None of these locations is particularly convenient for a user to access. Many times a user needs such information to assist a technician to complete a technical support service call. During a technical support call, customers are not often patient with requests by the technician to open up the computer system to identify a product or to try and find product documentation that the user may not have seen for months or years. Sometimes information is included electronically in the operating system device information as well, but such information is often incomplete and does not include computer system manufacturers' unique identifiers.

Second, many components include additional information explaining their operation or use. Such information may be included in files called "ReadMe" files. ReadMe files are well known in the art. However, ReadMe files are typically associated with a single hardware or software component. Often they reside in the same directory as the executable file of a software component, or in the same directory as the driver file of a hardware device. Therefore, if the user knows where to look, the ReadMe file can be found. Nonetheless, a veritable search must be conducted to locate and read all of the files.

There are some limited display mechanisms in the art. For example, it is known in the art to automatically present a ReadMe file upon completion of the downloading or installation of a software application. However, such a mechanism is merely for the particular software application that has been downloaded or installed. Further, the ReadMe file is inconvenient to locate at a later time.

Conventionally, hardware and software component information is conveyed to end users by paper manuals and flyers. However, paper products are relatively expensive. Not only is there the cost of the paper and printing, but there is also cost associated with placing manuals and flyers in shipping containers. As discussed above, many varieties of systems with various combinations of components are produced, and each variety needs only certain manuals or flyers. Further, if there is a need to draw attention to particular information by use of color paper or printing, the expense increases.

What is needed is a means of efficiently and cost effectively distributing information to computer system users. It would be advantageous for information to be loaded for distribution electronically, and also to be placed in a location that is visible and easily accessible to users. An improved system would be capable of activating itself upon starting of the computer system. An improved system could be loaded onto all of the systems a manufacturer produces and could automatically find the proper data to display, or if no data to display exists, could prevent itself from being automatically started. A further improved system could be set to only automatically activate itself a limited number of times. Regardless of automatic activation, a user of the improved system could still view the information in a convenient manner.

SUMMARY OF THE INVENTION

An embodiment of the invention is a method of displaying data about a computer system on the computer system itself. An act toward accomplishing the method is initiating a boot sequence of the computer system. Additionally, a key is read to initiate execution of a program that accesses data files for display, the key being read from a system information area. If data files containing data to be displayed on the computer system are in predetermined locations in the computer system, execution of the program is continued. Continuation of the program includes: opening a graphical user interface (GUI); associating the data files to be displayed with the GUI; and displaying the data about the computer system. If no data files are in predetermined locations in the computer system, then the key is removed from the system information area during the boot sequence. The acts of this and other embodiments may be included on a removable media storage device.

Another embodiment of the invention is a method of conveying information to a computer system user. Information is conveyed by automatically executing a program upon startup of the computer system, the program enabling the display of computer system information, and displaying data about the computer system from data files stored on the computer system. The displayed data may correspond to installed computer system components, and at least a portion of the data may be written to the computer system during the manufacturing process by the computer system original equipment manufacturer. The automatically executing program is configurable to be installed on any variety of a model of a computer system and display the appropriate data for the particular variety, or to remove itself from the system if no data is available for display.

Yet another embodiment of the invention is a method of manufacturing a computer system enabled to display information about the computer system. Acts of the method may include: loading data files into a subdirectory of the operating system root directory of the computer system, wherein the data files provide information about the components installed in the computer system; loading an executable file operable to access and display the data files into a subdirectory of the operating system root directory of the computer system; and loading a key into a system information area of the computer system, the key operable to call for the execution of the executable file. The executable file is executed upon startup of the computer system a selectable number of times, the number of times being included in the key that calls for execution.

Still another embodiment of the invention is a computer system with a motherboard, a main memory coupled to the motherboard, a component coupled to the motherboard, and a processor coupled to the motherboard. The processor may be programmed to execute the following instructions: upon system startup, determine if displayable files are present in a predetermined directory; if displayable files are present in the predetermined directory, then spawning a graphical user interface (GUI) to display the displayable files by linking to the displayable files; and provide an interface for a user to deactivate spawning of the GUI upon system startup.

BRIEF DESCRIPTION OF THE DRAWINGS

FIG. 5 is text from a data file of one of the embodiments of the invention.

DETAILED DESCRIPTION OF THE INVENTION

Figure 2:
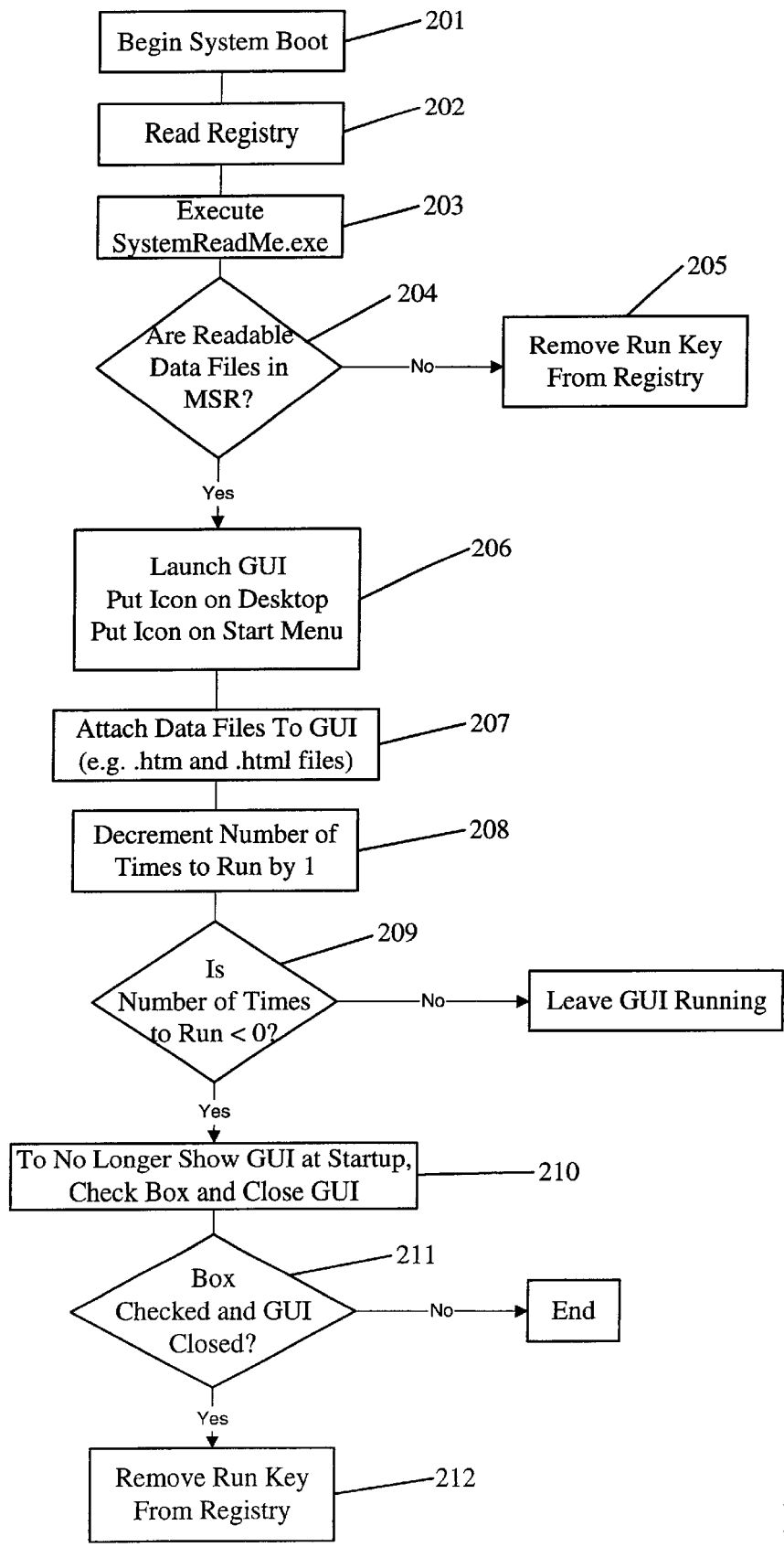
FIG. 2 is a flowchart illustrating embodiments of the invention.
Figure 3:
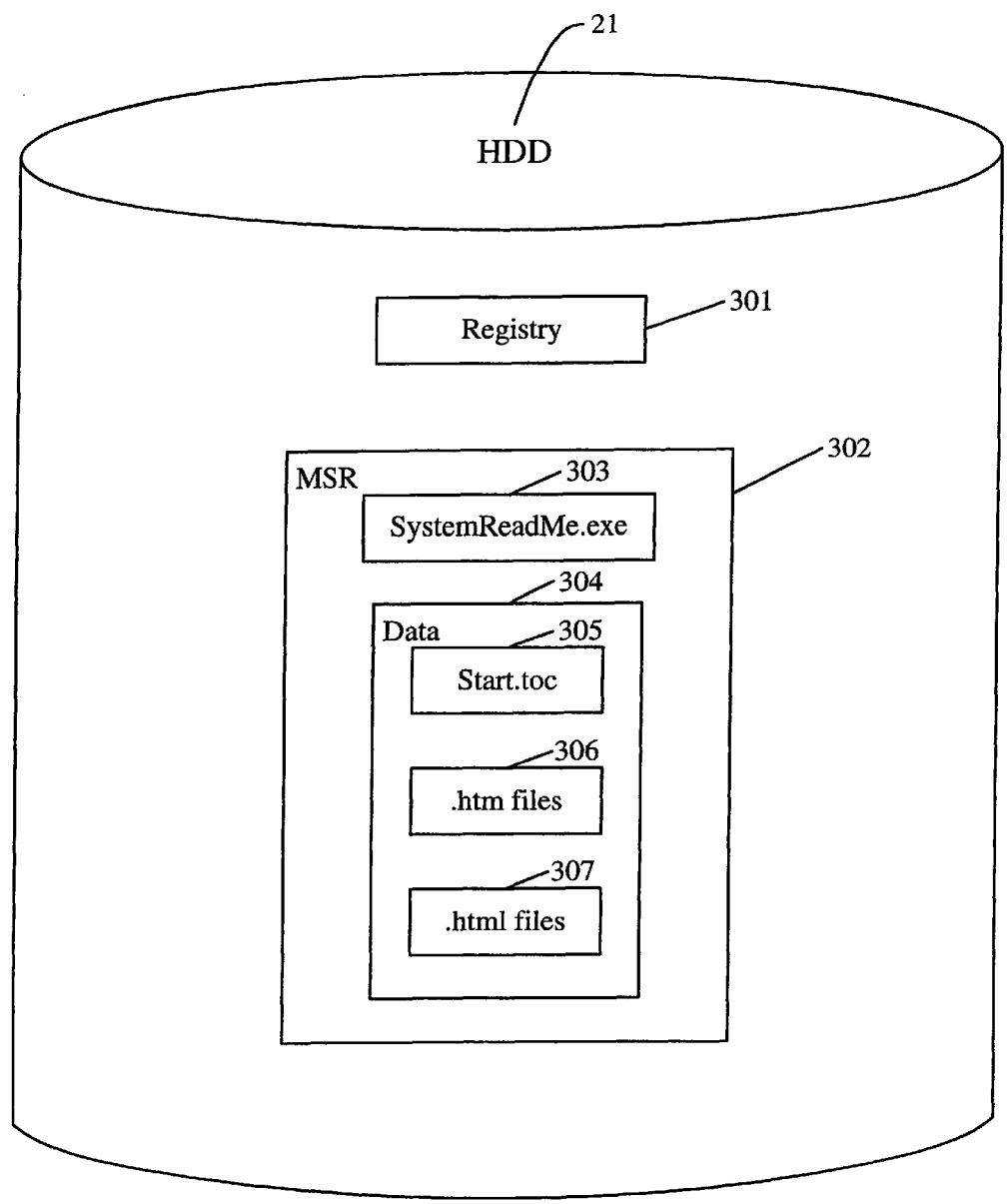
FIG. 3 is a block diagram showing data structures within a hard disk drive of an embodiment of the invention.

Embodiments of the present invention are directed toward a method of conveying information or displaying data about a computer system. The display of the data may be presented on the computer system itself. In this manner, the information may be conveyed to the computer system user. In a computer system such as the computer system illustrated in FIG. 1, the method may be accomplished by initiating a boot sequence of the computer system as shown at block 201 of FIG. 2. At block 202, a key is read from a system information area of the computer system. Block 202 illustrates reading of a specific type of system information area common to many personal computer systems called the Registry. The Registry is common to most systems employing a MICROSOFT WINDOWS type operating system. Generally, the Registry is a single place for keeping information like what hardware is attached, what system options have been selected, how computer memory is set up, and what application programs are to be present when the operating system is started. As shown in FIG. 3, the Registry 301 may be stored on a hard disk drive (HDD) 21. In relation to FIG. 1, the HDD 21 of FIG. 3 is one of the IDE Drives 19 in one embodiment of the invention. Alternatively, the Registry may be stored in a location accessible to the computer system through a network connection. Examples of networks that could be employed include but are not limited to a local area network, a wide area network, a wireless network, and the Internet.

Continuing with block 202, the key that is read could be a string such as "C:\Windows\MSR\SystemReadMe.exe 7." This key directs the computer to initiate execution of the executable file SystemReadMe.exe, which is located in the operating system root directory Windows, in the subdirectory MSR. The name of the operating system root directory would be different with some versions of WINDOWS, or with other operating systems. The subdirectory illustrated here is an acronym for Micron System ReadMe, and could be named any legal directory name in other implementations. The number 7 designates the number of times SystemReadMe.exe is to automatically execute before giving the user the opportunity to disable automatic execution. The use of the number of times to run variable will be discussed in more detail below.

Block 203 illustrates the actual execution of the SystemReadMe.exe that follows from reading of the key in the Registry. As illustrated in FIG. 3, the MSR subdirectory of this embodiment contains the SystemReadMe.exe file 303, and readable data files 304. Upon execution (block 204), SystemReadMe.exe 303 checks to see if there are data files 305–307 in a predetermined location. That is, in this case, if the files are in the MSR subdirectory. The predetermined location in other embodiments could be any location capable of storing a file. The act of determining if data files are in predetermined locations can include acts such as checking for hypertext markup language file identifiers or text file identifiers. Similarly, the displayable data files could be any type of file that contains information that can be displayed. FIG. 3 provides examples of data files 304, that may be displayed. Specifically, Start.toc 305, all files with .htm extensions 306, and all files with .html extensions 307 may be displayed in some embodiments. If there are no appropriate data files in the predetermined location, then, as illustrated in block 205, the run key is removed from the system information area and the program will not automatically execute during future system startups. Because the automatically executing program is able to remove itself from the system on which it is installed if no data is available for display, the program is configurable to be installed on any variety of a model of a computer system and display the appropriate data for the particular variety. That is, if there is data loaded, it will be displayed. If no data is available, the program is automatically removed without harm to the system.

If there are appropriate data files in the predetermined location, execution continues as illustrated in block 206. Upon execution of the embodiment illustrated, a graphical user interface (GUI) is launched and execution icons are placed on the "Desktop" of the computer system operating system interface, and in the "Start Menu" of the operating system interface. An execution icon is a selectable symbol that represents some application, capability, identity, or the like that is associated with the application, capability, or identity. By selecting an icon, a user instructs execution or revelation of the application, capability, or identity. The Desktop is a graphical representation of some of the common functions that a computer is capable of performing. Typically, the Desktop is the default opening screen following successful startup of a graphically based operating system. The "Start Menu" is another means of accessing programs and functions capable of being performed by a computer. Typically, the Start Menu is a pull-down menu. In some embodiments, these two icons remain on the Desktop and in the Start Menu even if the run key is later removed from the system information area.

Figure 4:
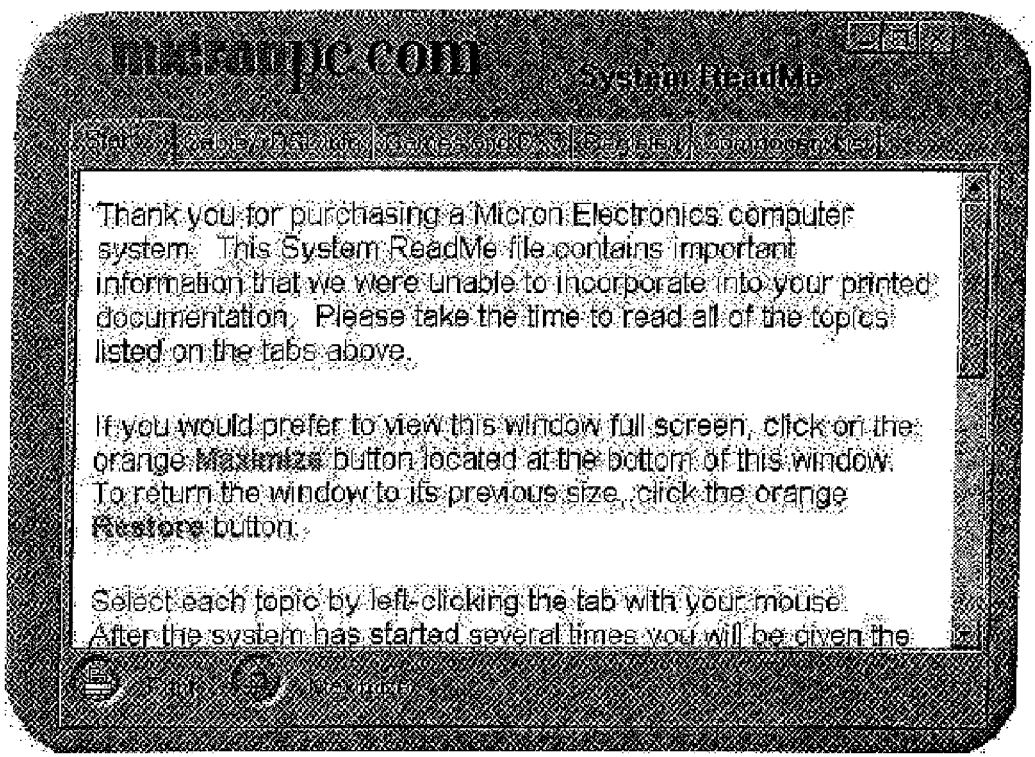
FIG. 4 is an image of an embodiment of a graphical user interface of the invention.

An embodiment of a GUI of the invention is illustrated in FIG. 4. The GUI shows a row of tabs along the top: Start, Cable/xDSL Info, Games and DX7, Register!, and Component List. The tabs correspond to the data files 304 (FIG. 3) that are found by the executing program in the predetermined location. For example, the Start tab corresponds to Start.toc 305, and the remaining files correspond respectively to .htm 306 and .html 307 files located in the predetermined location. Following detection of readable data files, the data files are attached or associated with the GUI at block 207 of FIG. 2.

FIG. 4 shows the display of the data about the computer system that follows from attachment of the data files 304. The data files 304 used to generate displayed data may include, but are not limited to, data about hardware installed on a system, software installed on a system, or even data directed to the circumstances of the user of the system. For instance, there may be similar data files for display of data in more than one language. Additionally, there may be data files included that are directed to users employed or sponsored by some other organization. An example would be where a government agency that was buying a large number of similarly configured systems had the original equipment manufacturer load a displayable ReadMe file giving users instructions on how to perform some operation with the system in conjunction with the agency's mainframe computer. Other similar instructions could be provided. The last tab shown in FIG. 4 is the Component List tab. At least a portion of the text contained in the data for a sample Component List tab is shown in FIG. 5. The actual data for the Component List is hypertext markup language data in the present embodiment. The resulting text, as further formatted by hypertext tags, is what is shown in FIG. 5. The Component List information is useful in determining the product identifier for all of the components installed in a particular system. With this list, a user can easily access and identify the part numbers for each of the components that originally shipped with the computer system.

In certain embodiments of the invention, the program continues to execute by decrementing the number of times to run variable. The number of times to run variable was discussed above in association with the run key. This act is illustrated in block 208 of FIG. 2. By maintaining the number of times to run variable, the number of times the program is initiated after a boot sequence may be tracked. As shown at block 209, when the variable reaches a predetermined level, less than zero in the case illustrated, an interface to disable further automatic execution of the program following a boot sequence is enabled. If the predetermined level has not been reached, the graphical user interface is left running and automatic execution will be accomplished after the next system boot.

Blocks 210 and 211 represent an embodiment of the enabled interface used to disable further automatic execution. In this instance, the interface presents a box to the user that may be check, and instructions to check the box and close the GUI to stop further automatic executions of the program following a boot sequence. Stopping further automatic execution is accomplished by removing the run key from the Registry, as illustrated at block 212. If either the block is not checked or the GUI is not closed, the program ends and automatic execution will be accomplished after the next system boot.

Figure 6:
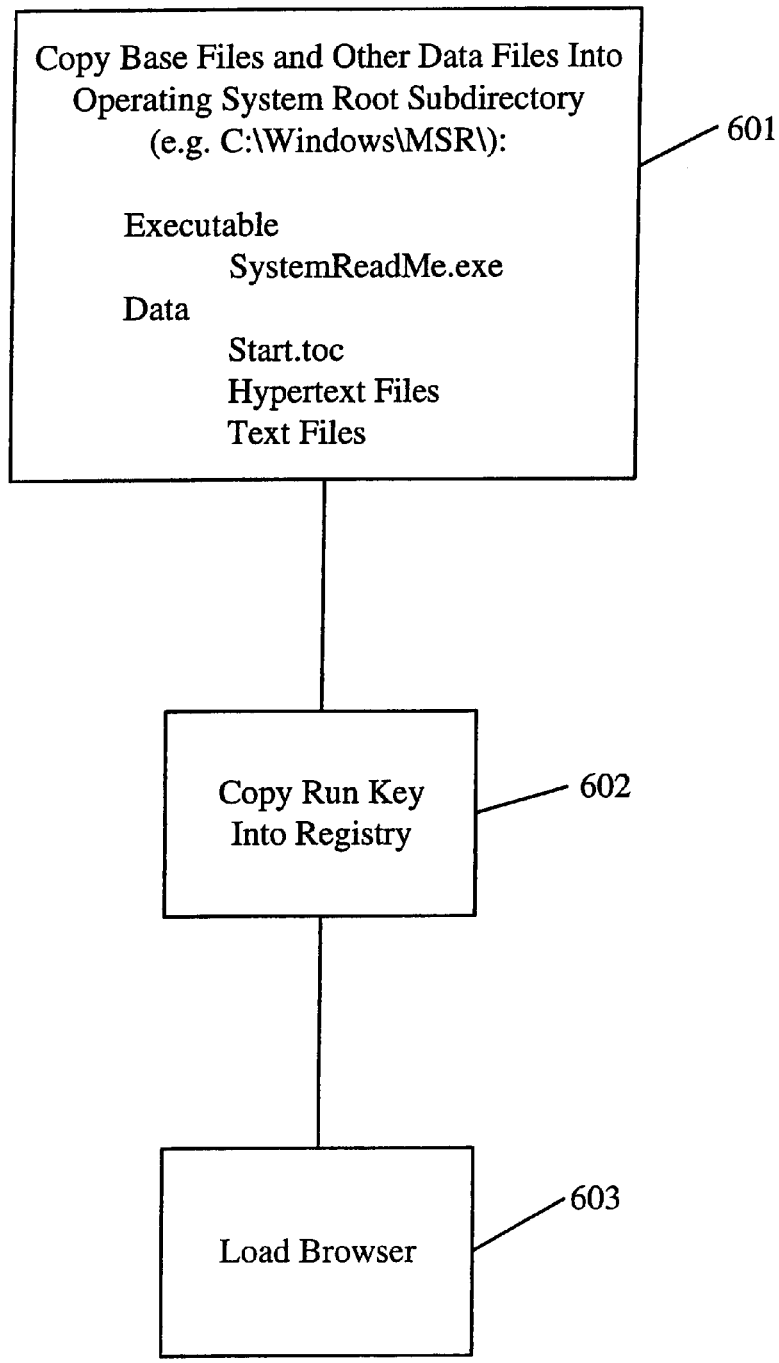
FIG. 6 is a flowchart illustrating embodiments of the invention.

Another embodiment of the invention is a method of manufacturing a computer system enabled to display information about the computer system. As illustrated in FIG. 6, at block 601, the method includes loading base files and other data files into an operating system root, or a subdirectory of the operating system root. As discussed above, the operating system root may be, for example, C:\Windows. An example subdirectory is MSR. As illustrated at block 601, the executable file operable to access and display the data files is the file SystemReadMe.exe. The executable file may be considered one of the base files of the invention. The executable file, along with the data file Start.toc, could be considered a base file to the extent that both of these files could be loaded on any system under embodiments of the present invention. Other data files such as the Hypertext Files and Text Files shown in block 601 may also be loaded into the subdirectory MSR. As discussed above, these and other such data files may provide various information about the components installed in the computer system. Some or all of this state of may be written to the computer system during the manufacturing process by the computer system original equipment manufacturer.

Embodiments of the method of manufacturing a computer system may also include the act of loading the key into a system information area of the computer system. In FIG. 6, this act is illustrated at block 602. As is also discussed above, the key is operable to call for the execution of the executable file, SystemReadMe.exe, in the present example. A useful system information area into which the key may be loaded, is the Registry, whether the Registry stored on the hard disk drive, or over a network connection.

In embodiments of the method, the executable file is executed upon startup of the computer system a selected number of times. Similar to previous embodiments, the number of times may be included in the key which is called for execution. When the executable program is executed the selected number of times, an interface is provided enabling a user to stop further automatic executions of the program following system startup. The interface may include both a box to check and an instruction to manually shut down a graphical user interface in order to stop further executions of the program.

As shown at block 603 of FIG. 6, embodiments of the invention require the loading of a browser in order to properly display the graphical user interface of the invention. Dependent upon the operating system of the subject computer system, the browser may be loaded as a separate software application, or may be loaded as part of the operating system. Nonetheless, embodiments do require that a browser be loaded. In some embodiments, the browser loaded must be a newer browser such as Internet Explorer 4.0 or higher, as distributed by Microsoft Corporation.

Figure 1:
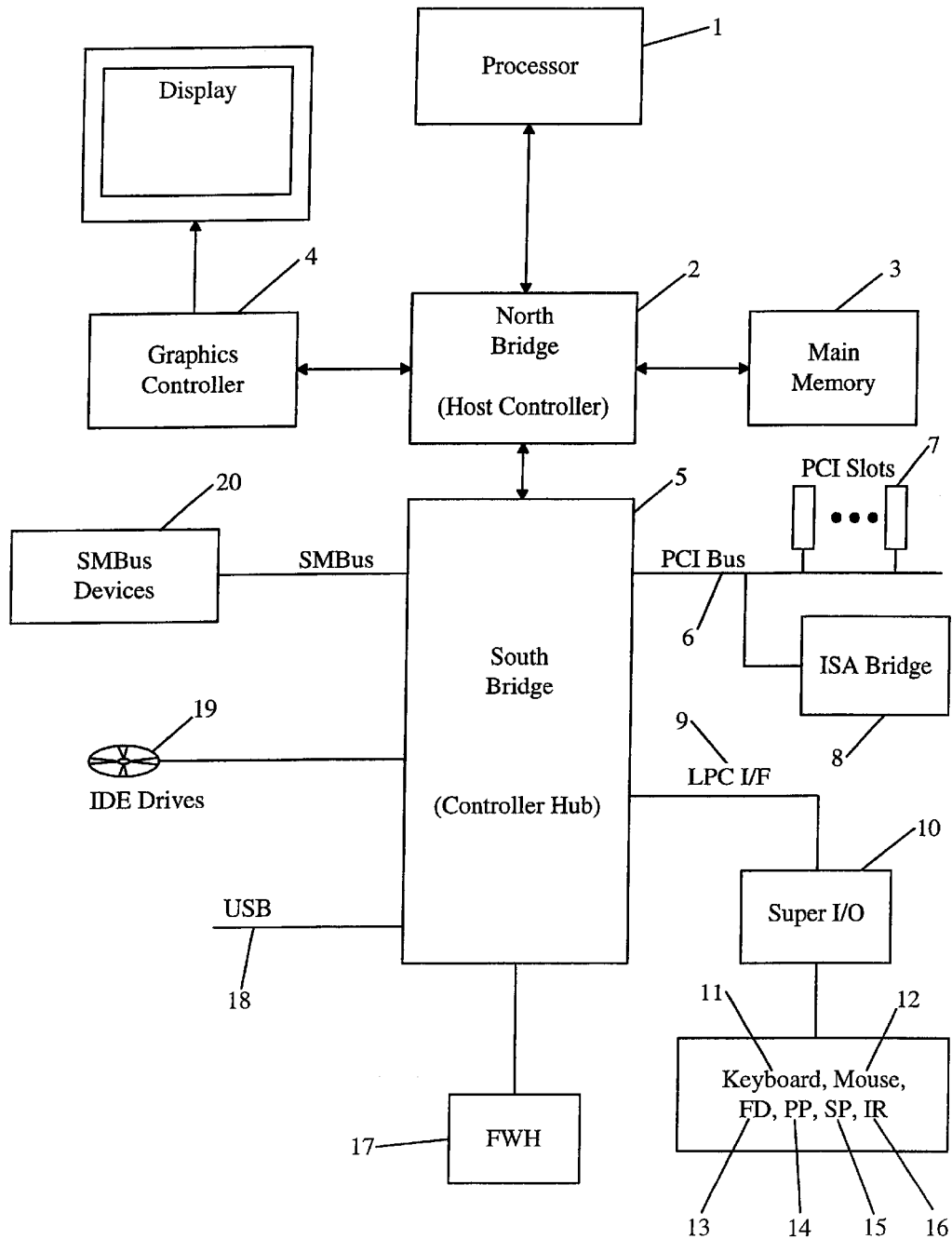
FIG. 1 is a computer system block diagram.

Referring to FIG. 1, an embodiment of the invention is a computer system. The computer system may include a motherboard with components such as North Bridge 2 and South Bridge 5. As illustrated, a main memory 3 is coupled to the North Bridge 2 portion of the motherboard. In FIG. 1, as would be well understood by one of ordinary skill in the art, a multitude of components are shown coupled to the motherboard as well. For instance, the component may be one or more of the components selected from the group consisting of a hard disk drive, a Peripheral Component Interconnect device, an input/output (I/O) device connected to I/O circuitry, a Universal Serial Bus device, an optical disk device, a graphics control device, and a display. The component might also be a software program residing on the hard disk drive. A processor 1 is shown coupled to the motherboard through the North Bridge 2. In the embodiment of the invention illustrated, the processor 1 is programmed to execute certain instructions. The instructions may include direction to determine if displayable files are present in a predetermined directory. As discussed above, a predetermined directory may be a subdirectory of the operating system root.

When displayable files are present in the predetermined directory, the graphical user interface may respond. The graphical user interface is used to display the displayable files by linking to those files. Desktop and Start Menu icons may also be automatically created upon spawning of the graphical user interface. An interface for a user to deactivate spawning of the graphical user interface upon startup is available in this embodiment as well. An automatic provision of the interface may occur after the computer system has been booted up a predetermined number of times as specified by a number copied to a system information area such as the Registry.

What is claimed is:

1. A method of displaying data about a computer system on the computer system comprising the acts of:

initiating a boot sequence of the computer system;

reading a key and initiating execution of a program that accesses data files for display, the key being read from a system information area;

if data files containing data to be displayed on the computer system are in predetermined locations in the computer system, then continuing execution of the program that accesses the data files for display by:

opening a graphical user interface (GUI), associating the data files to be displayed with the GUI, and displaying the data about the computer system; and if no data files are in predetermined locations in the computer system, then removing the key from the system information area during the boot sequence.

2. The method of claim 1 wherein the act of reading the key from the system information area includes reading the key from the Registry for the computer system.

3. The method of claim 1 wherein the act of determining if data files are in predetermined locations includes the act of reading a hypertext markup language file identifier.

4. The method of claim 1 wherein the act of determining if data files are in predetermined locations includes the act of reading a text file identifier.

5. The method of claim 1 wherein the act of determining if data files are in predetermined locations includes determining if data files are in a subdirectory of an operating system root directory.

6. The method of claim 1 wherein the act of continuing execution of the program that accesses the data files for display includes placing an execution icon on a desktop of the computer system.

7. The method of claim 1 wherein the act of continuing execution of the program that accesses the data files for the display includes placing an execution icon in a Start Menu of the computer system.

8. The method of claim 1 wherein the act of continuing execution of the program that accesses the data files for display includes tracking a number of items the program is initiated after a boot sequence.

9. The method of claim 8 wherein tracking the number of times the program is initiated after a boot sequence includes maintaining a variable in the key that is decremented each time the program is initiated after a boot sequence, and when the variable reaches a predetermined level, providing an interface to stop further automatic executions of the program following a boot sequence.

10. A method of conveying information to a computer system user comprising:

automatically executing a program upon startup of the computer system, the program enabling the display of computer system information; and displaying data about the computer system from data files stored on the computer system;

wherein the displayed data corresponds to installed computer system components, and at least a portion of the data is written to the computer system during the manufacturing process by the computer system original equipment manufacturer;

wherein the automatically executing program is configurable to be installed on any variety of a model of a computer system and display the appropriate data for the particular variety, and the automatically executing program is configurable to remove itself from the system if no data is available for display.

11. The method of claim 10 wherein the displayed data corresponding to installed computer components includes data corresponding to installed hardware components.

12. The method of claim 10 wherein the displayed data corresponding to installed computer components includes data corresponding to installed software components.

13. The method of claim 10 further comprising displaying data directed to circumstances of a user ordering the computer system.

14. The method of claim 13 wherein displaying data directed to the circumstances of the user includes displaying data in multiple languages.

15. The method of claim 13 wherein displaying data directed to the circumstances of the user includes displaying data requested for presentation to the user by the organization by whom the user is employed or sponsored.

16. A method of manufacturing a computer system enabled to display information about the computer system comprising the acts of:

loading data files into a subdirectory of an operating system root directory of the computer system, wherein the data files provide information about components installed in the computer system;

loading an executable file operable to access and display the data files into a subdirectory of an operating system root directory of the computer system; and loading a key into a system information area of the computer system, the key operable to call for execution of the executable file;

wherein the executable file is executed upon startup of the computer system a selectable number of times, the number of times being included in the key that calls for execution.

17. The method of claim 16 wherein loading the data files includes loading data files providing information about hardware components installed in the computer system.

18. The method of claim 16 wherein loading the data files includes loading data files providing information about software components installed in the computer system.

19. The method of claim 16 wherein loading the data files includes loading data files providing information in various languages.

20. The method of claim 16 wherein loading the data files includes loading data files providing information from the sponsoring organization or employer of the user of the computer system.

21. The method of claim 16 wherein loading the key into a system information area includes loading the key into the Registry for the computer system.

22. The method of claim 21 wherein loading the key into the Registry includes loading the key into a Registry stored on the hard disk drive of the computer system.

23. The method of claim 21 wherein loading the key into the Registry includes loading the key into a Registry stored in a location accessible to the computer system through a network connection.

24. The method of claim 16 wherein in response to having executed the executable file the selected number of times, providing an interface enabling a user to stop further automatic executions of the executable file following system start up.

25. The method of claim 24 wherein providing an interface enabling a user to stop further automatic executions of the executable file includes providing a box to check and instruction to manually shut down a graphical user interface for the running executable file, both actions being necessary to stop further automatic execution of the executable file.

26. A computer system comprising:

a motherboard;

a main memory coupled to the motherboard;

plural components coupled to the motherboard; and a processor coupled to the motherboard programmed to execute the following instructions:

upon system startup, determine if displayable files are present in a predetermined directory, the displayable files containing information pertaining to the plural components, if displayable files are present in the predetermined directory, then spawn a graphical user interface (GUI) to display the displayable files by linking to the displayable files, and provide an interface for a user to deactivate spawning of the GUI upon system startup.

27. The computer system of claim 26 wherein the components comprise two or more components selected from the group consisting of a hard disk drive, a Peripheral Component Interconnect device, an input/output (I/O) device connected to I/O circuitry, a Universal Serial Bus device, an optical disk device, a graphics control device, and a display.

28. The computer system of claim 26 wherein the component comprises a software program residing on a hard disk drive.

29. The computer system of claim 26 wherein if displayable files are present in the predetermined directory, then an execution icon for spawning the GUI is placed on the desktop of the computer system operating system interface.

30. The computer system of claim 26 wherein if displayable files are present in the predetermined directory, then an execution icon for spawning the GUI is placed in the Start Menu of the computer system operating system interface.

31. The computer system of claim 26 further comprising instructions that automatically provide the interface for a user to deactivate spawning of the GUI upon system startup, the automatic provision securing after the computer system has been booted up a predetermined number of times.

32. The computer system of claim 31 wherein the predetermined number is placed in a system information area of the computer system.

33. The computer system of claim 32 wherein the system information area is the Registry for the computer system.

34. A removable media storage device containing instructions to display data about a computer system on the computer system, the instructions comprising the acts of:

initiating a boot sequence of the computer system;

reading a key and initiating execution of a program that accesses data files for display, the key being read from a system information area;

if data files containing data to be displayed on the computer system are in predetermined locations in the computer system, then containing execution of the program that accesses the data files for display by:

opening a graphical user interface (GUI), associating the data files to be displayed with the GUI, and displaying the data about the computer system; and
if no data files are in predetermined locations in the computer system, then removing the key from the system information area during the boot sequence.

35. The removable media storage device of claim 34 wherein the act of reading the key from the system information area includes reading the key from a Registry for the computer system.

36. The removable media storage device of claim 34 wherein the act of determining if data files are in predetermined locations includes the act of reading a hypertext markup language file identifier.

37. The removable media storage device of claim 34 wherein the act of determining if data files are in predetermined locations includes the act of reading a text file identifier.

38. The removable media storage device of claim 34 wherein the act of determining if data files are in predetermined locations includes determining if data files are in a subdirectory of an operating system root directory.

39. The removable media storage device of claim 34 wherein the act of continuing execution of the program that accesses the data files for display includes placing an execution icon on a desktop of the computer system.

40. The removable media storage device of claim 34 wherein the act of continuing execution of the program that accesses the data files for display includes placing an execution icon in a Start Menu of the computer system.

41. The removable media storage device of claim 34 wherein the act of continuing execution of the program that accesses the data files for display includes tracking the number of times the program is initiated after a boot sequence.

42. The removable media storage device of claim 41 wherein tracking the number of times the program is initiated after a boot sequence includes maintaining a variable in the key that is decremented each time the program is initiated after a boot sequence, and when that variable reaches a predetermined level, providing an interface to stop further automatic executions of the program following a boot sequence.

\* \* \* \* \*